United States Patent [19]

Bochan

[11] 4,299,319

[45] Nov. 10, 1981

[54] TWO-SPEED CLUTCH

[75] Inventor: John Bochan, Louisville, Ky.

[73] Assignee: General Electric Company, Louisville, Ky.

[21] Appl. No.: 72,273

[22] Filed: Sep. 4, 1979

[51] Int. Cl.³ .................. F16D 43/06; F16D 21/00
[52] U.S. Cl. .............................. 192/103 B; 192/103 R
[58] Field of Search ........ 192/103 B, 103 R, 105 CD, 192/105 BB, 105 CF, 46, 71; 68/23 R; 210/361

[56] References Cited

U.S. PATENT DOCUMENTS

| | | | |
|---|---|---|---|
| 2,087,488 | 7/1937 | Stanley | 192/105 CD X |
| 2,869,344 | 1/1959 | Bochan | 68/12 |
| 2,869,699 | 1/1959 | Bochan | 192/48 |
| 3,092,230 | 6/1963 | Sisler | 192/105 CD |
| 3,131,797 | 5/1964 | Bochan | 192/103 B |
| 3,197,004 | 7/1965 | Salsbury | 192/103 B X |
| 3,258,095 | 6/1966 | Shelton | 192/103 B |
| 3,382,686 | 5/1968 | Hartley | 68/23 |
| 3,463,285 | 8/1969 | Sisler | 192/105 CD X |
| 3,724,622 | 4/1973 | Barbulesco et al. | 192/103 B X |
| 3,954,162 | 5/1976 | Densow | 192/103 B X |

FOREIGN PATENT DOCUMENTS

| | | | |
|---|---|---|---|
| 834482 | 7/1949 | Fed. Rep. of Germany | 192/105 CD |
| 1239896 | 5/1967 | Fed. Rep. of Germany | 192/105 CD |
| 514314 | 2/1955 | Italy | 192/105 CD |
| 575067 | 2/1946 | United Kingdom | 192/105 CD |

Primary Examiner—C. J. Husar
Assistant Examiner—Mark A. Daugherty
Attorney, Agent, or Firm—H. Neil Houser; Radford M. Reams

[57] ABSTRACT

A two-speed clutch in which an input rotary drive is transmitted to an output rotary member to produce a high speed direct drive in which the output rotary member is driven at the same speed as the input member, or to produce a reduced output speed. The input member comprises an inner drum driven by centrifugally actuated clutch shoes in turn driven by an input shaft. A second set of clutch shoes is interposed between the inner drum and the output member consisting of an outer drum, which clutch shoes are designed to be centrifugally disengaged to produce a controlled slip between the inner and outer drums to reduce the output speed. In the high speed mode, the inner and outer drums are latched together to rotate at the same speed by a pivotally mounted latch mounted on the outer drum and an expanding spring element mounted to the inner drum, with engagement between the latch and expanding spring taking place at a predetermined rate of rotation of the inner drum to establish high speed drive. A trigger element is operable to release the latch and allow it to be centrifugally moved out of the path of the expanding spring precluding engagement of the latch with the expanding spring by energization of the trigger whenever low speed drive is to be established through the unit.

12 Claims, 6 Drawing Figures

TWO-SPEED CLUTCH

BACKGROUND OF THE INVENTION

This invention concerns multi-speed drives and more particularly a two-speed clutch drive in which the rotary drive from the input shaft is transmitted to a rotary output member in either a high speed direct drive mode or in a reduced speed mode in which the output member is driven at a slower speed than the input shaft.

Such multi-speed drives are utilized in a variety of applications such as in clothes washing machines where an electric drive motor is employed to cause rotation of the washing machine agitator and basket in order to suit the washing action and spin extraction cycles to differing wash cycles in which the washing and drying action are adapted to different fabric types, i.e., slow speeds for delicate fabrics and normal or high speed for regular fabric.

One approach for producing such multi-speed drive is the use of a two-speed clutch in which the output shaft of a drive motor is transmitted via a clutch having a first mode in which the rotation of the input motor shaft is transmitted to an output member at the same rotative speed. In a second mode, a controlled slip of the clutch produces a reduced speed of the output member relative to the rate of rotation of the drive motor.

This arrangement is described in U.S. Pat. No. 2,869,699. The two-speed drive depicted in this patent includes an inner drum constituting a rotary input member surrounding the motor shaft and a concentric outer drum constituting the rotary output member which is adapted to drive the washing machine transmission input. In these applications, the motor is also adapted to directly drive the washing machine drain pump by means of a motor shaft extension extending from the two-speed drive clutch and fitted with a coupling connected to the input shaft of the pump or pumps.

The clutch includes centrifugally actuated clutch shoes carried on a carrier plate which is fixed to the motor shaft and are adapted to engage the inside of the inner drum upon rotation of the motor shaft to establish drive from the motor shaft to the clutch inner drum. The centrifugal action limits the torque loading of the motor for heavy laods, such as initial spin down of a full basket.

The outer drum and inner drum are adapted to be drivingly connected by two separate clutching interconnections which when operated respectively establish either low speed or high speed drive between the inner drum and the outer drum.

The low speed clutch arrangement includes clutch shoes which are drivingly connected to the output drum and which are frictionally engaged with the inner drum exterior by spring applying pressure, which pressure is reduced with increasing rotative speed of the outer drum due to a centrifugal disengagement force which is generated acting to disengage the so-called slip shoes. The result of this action is to establish a reduced constant output speed drive from the inner drum to the outer drum.

Direct drive is established by means of a carrier plate upon which is mounted two sets of pivotally mounted clutch shoes. Upon rotation of the carrier plate, one set moves into engagement with the exterior outside diameter of the inner drum and the other set moves into engagement with the outer drum to establish drive between the outer drum and inner drum at a direct drive ratio.

The design relies on control over the drive to the carrier plate to establish the direct drive condition. The carrier plate is rotatably mounted on the motor shaft by means of a friction bearing and tends to be accelerated by rotation of the motor shaft which will in turn establish a driving connection of the inner drum and increase the speed of rotation of the carrier plate until direct drive between the inner and outer drums is achieved.

The low speed drive is created by a solenoid actuated braking shoe moved into engagement with the carrier plate, preventing rotation of the carrier plate and thus avoiding the direct drive condition, until the actuator releases the locking brake to enable the friction bearing to rotate the carrier plate as described.

The presence of this second carrier plate requires the assembly of the clutch to the motor shaft and of the various separate components in the assembly of the extension shaft to the motor shaft at the assembly of the unit. This in turn necessitates a clamping connection between the motor shaft and the shaft extension occupying a portion of the axial depth of the unit. This appreciably increases the expense of the unit since motor shafts must be machined to enable the clamping connection to be made. Separate clamping components and fasteners are also of necessity employed. The alignment of the motor shaft and shaft extension is difficult to maintain, whicy may cause noise and unbalance of the shaft extension.

In addition, the presence of the clamp limits the bearing support available for the inner drum since the clamp connection preemps the axial space available for such bearing. The carriage plate and clutch shoes represent a significant cost item, as well as does the related components, such as the ball bearing required to support the same on the motor shaft.

The presence of the clamp also increases the depth of the clutch unit and the attendant long motor extension shafts required.

This arrangement also requires a resilient support of the centrifugally actuated shoes to limit the noise due to vibrations being transmitted between the inner and outer drums.

It is therefore an object of the presen invention to provide such a two-speed clutch of this general type in which drive is established between an inner drum and an outer drum by two differing clutching arrangements, one of which establishes direct drive and the other of which establishes a reduced slipping drive, in which the necessity for the carrier plate referred to above is eliminated, to also eliminate the cost of the carrier plate and mounting components.

It is another object of the present invention to provide such two-speed drive having a shaft extension for direct drive of the other components in which the necessity for a separate clamping of the shaft extension to the motor shaft is obviated.

It is a further object of the present invention to provide such two-speed drive in which a separate resilient mounting means for the centrifugal clutch shoes is avoided while eliminating the transmission of the vibrations between the inner and outer drums.

It is still another object of the present invention to provide such a drive in which the overall clutch depth is reduced, as well as the auxiliary shaft and the motor shaft lengths, and in which the adequate bearing support of the inner drum is afforded.

SUMMARY OF THE INVENTION

These and other objects of the present invention, which will become apparent upon a reading of the following specification and claims, are achieved by a latching arrangement acting between the inner and outer drums which establishes a direct drive from the inner drum to the outer drum without the necessity for a separate carrier plate and a separate clutch shoe carried on the carrier plate. This lock-up arrangement consists of a centrifugally expandable strip spring which is mounted to the inner drum having free ends thereof which expand against a preloading force to move radially outwardly upon rotation of the inner drum at a predetermined rate of rotation.

A pivotal latch is provided which has a portion which is positionable at a radially inward position such as to engage either of the free spring ends in the expanded position which establishes direct drive between the inner and outer drums. The latch is held in position at the radially inward position by means of a trigger which is movable into and out of engagement with a protrusion formed on the pivotal latch. With the trigger out of engagement, the latch is free to move radially outwardly at a very low speed prior to the outward movement of the centrifugally expandable strip spring such as to preclude the lock up on the inner and outer drums with the trigger in the releasing position.

The trigger in turn is pivotally mounted and adapted to be moved by an actuator to move into and out of engagement with the tail portion of the trigger so as to pivot the trigger and release the latch, allowing it to move radially outwardly.

The latch engagement with the spring strip end enables deflection of the contacted strip spring end, to absorb the shock of lock up of the clutch as well as to vibrationally isolate the inner and outer drum, and eliminate the need for separate vibration isolating mounting as of the centrifugal clutch shoes establishing drive from the motor shaft to the inner drum.

The resultant eliminating of the second carrier plate described above as well as the associated clutch shoes greatly simplifies the configuration of the clutch and also allows sufficient axial depth for the provision of bearing support for the inner drum, to increase the bearing life as well as to reduce the noise generated by rotation of the inner drum om its bearings.

The resultant geometry simplification of the motor shaft extension and the motor shaft itself further reduces the cost since the motor shaft and the shaft extension may be press fitted together, resulting in a highly concentric assembly and eliminating the cost of the shaft extension clamp. The concentricity of the mounting of the motor shaft and shaft extension is improved to reduce the noise and unbalance.

DETAILED DESCRIPTION

Figure 1:
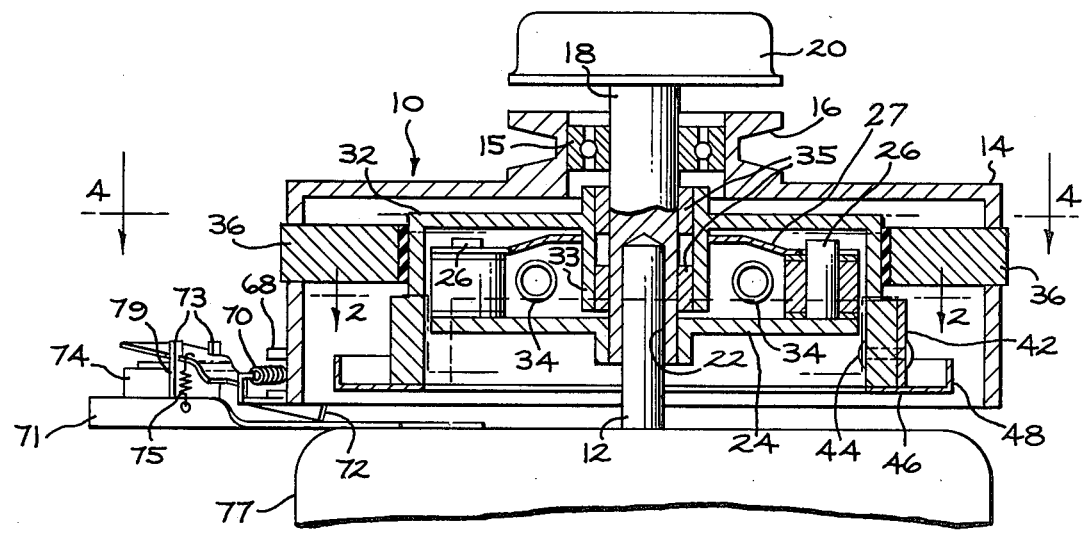
FIG. 1 is a view of a two-speed drive according to the present invention shown in partial transverse section.
Figure 4:
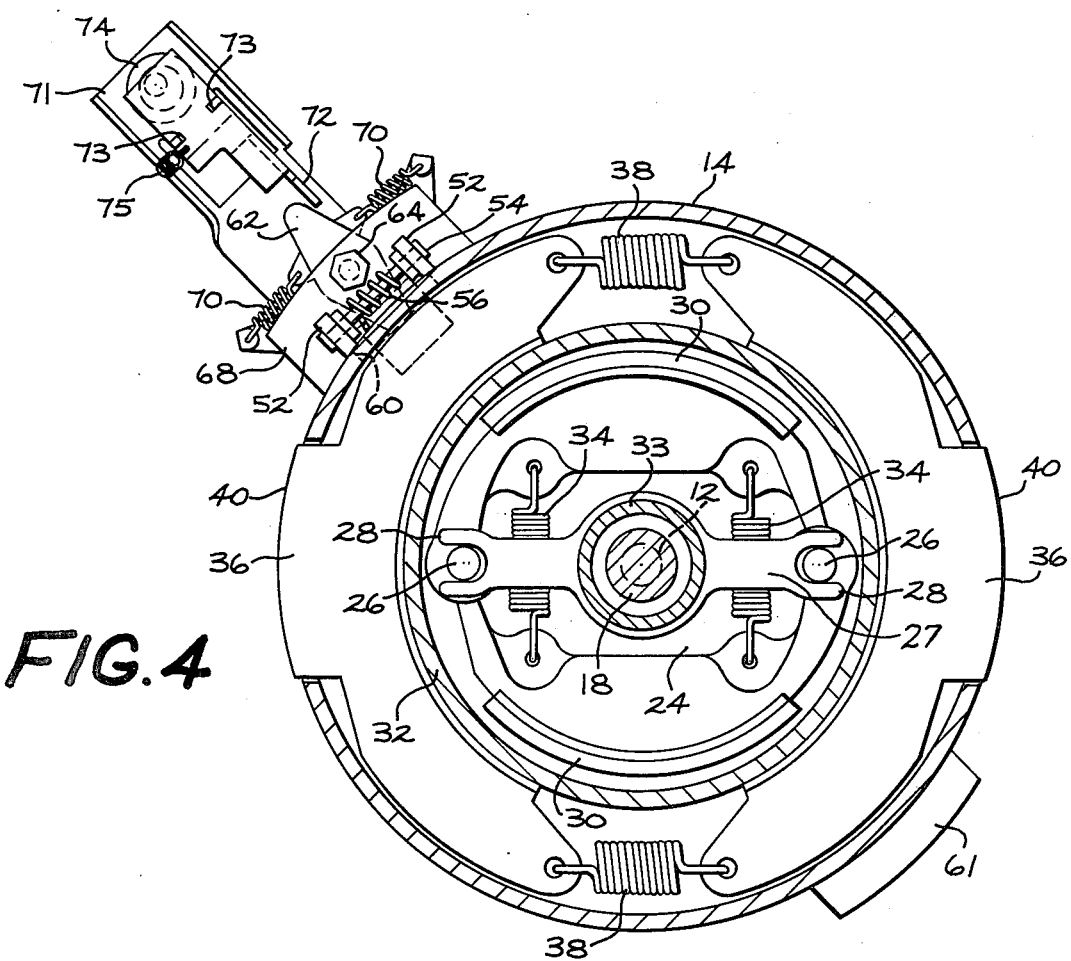
FIG. 4 is a view of the section 4—4 taken in FIG. 1.
Figure 2:
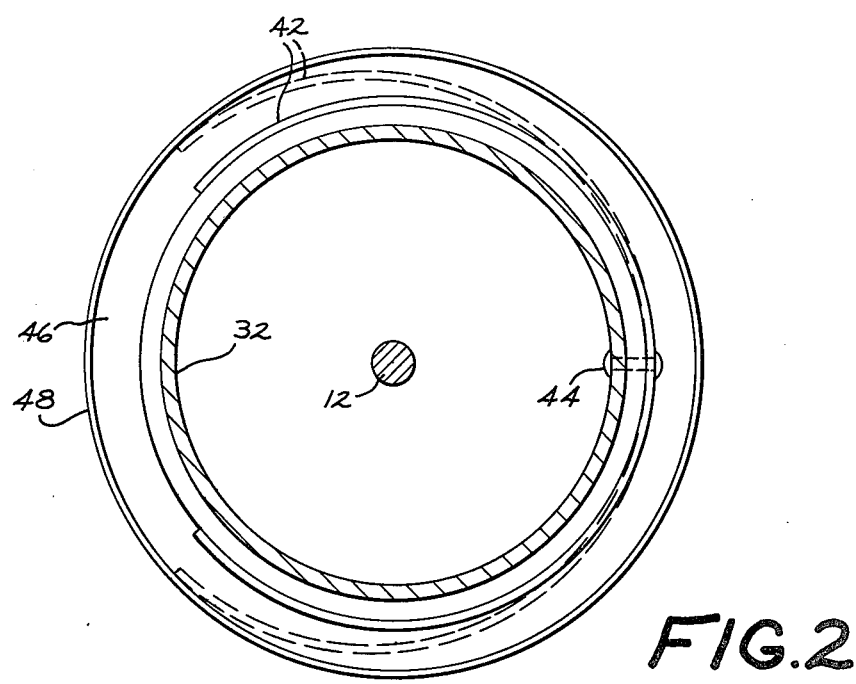
FIG. 2 is a view of the section 2—2 taken in FIG. 1.

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the two-speed clutch unit 10 according to the present invention is particularly adapted for the washing machine application described in the above-cited U.S. Pat. No. 2,869,699, although other applications of the clutch are of course possible. In this particular application, the input shaft 12 is adapted to be driven by an electric drive motor which serves to drive the output member comprised of an outer drum 14 having a pulley groove 16 receiving a belt drive for driving the input of the washing machine transmission (not shown). This drive is at either of two speeds, i.e., the high speed drive in which the outer drum 14 is driven at the same speed as the input shaft 12, and a second reduced speed in which the outer drum 14 is driven at a lesser rate of rotation than the input shaft 12.

The motor in such washing machine applications is designed to be reversible and, in a first direction of rotation, the transmission produces oscillation of the agitator and upon reversal thereof produces a direct drive to the basket for unidirectional spin.

Accordingly, the clutch is designed to produce an output rotation upon rotation of the input shaft 12 in either direction.

The input shaft 12 is connected to a shaft extension 18 to which is secured a pump coupling member 20 adapted to drive a flexible coupling (not shown) driving the input of the drain pump (also not shown).

Thus, there are two different output members driven by the input or motor shaft 12, the aligned shaft extension 18 and the concentric outer drum 14.

The shaft extension 18 is joined to the input shaft 12 by a press fitting of the end of the input shaft 12 within a bore 22 formed in the end of the adjacent shaft extension 18 so as to rotate together therewith.

The input shaft 12 is adapted to drive a carrier arm 24 which is press fitted to the outside diameter of the shaft extension 18 so as to rotate together therewith as a unit. The carrier arm 24 is adapted to drive a pair of clutch shoe pivot pins 26.

Each of the clutch shoe pivot pins 26 receives a respective clutch shoe 30 which is arcuately shaped and adapted to swing out into engagement with the interior inside diameter of an inner drum 32. The clutch shoes 30 are positively held on their respective pivot pins 26 by a retainer member 27 which includes clevis end portions 28 fitted around the pins over the shoes.

Outer drum 14 is rotatably supported on the shaft extension 18 by means of bearing set 15 which may be suitably configured to provide adequate support and resistance to thrusting in the conventional manner. The inner drum 32 is provided with bearing support by means of a hub 33 supported on the outside diameter of the shaft extension 18 with suitable bearing sets 35 being provided.

Each of the clutch shoes 30 are restrained from outward moving by tension springs 34 secured at either end to the clutch shoes 30. The clutch shoes move outwardly only upon rotation of the input shaft and carrier arm 34 and thereupon complete the driving engagement between the carrier arm 24 and the input shaft 12 and the inner drum 32.

The clutch shoes 30 and the mounting arrangement therefore provide a centrifugal clutching means drivingly connecting the input shaft 12 and the inner drum 32 which produces a driving connection therebetween upon rotation of the input shaft 12 in either direction.

As is well known in the art and described in U.S. Pat. No. 2,869,699, when the load driven from the drive 32 is relatively light, as when the agitator is being driven, then the shoes 30 will lock together carrier arm 24 and the drum 32 substantially immediately. When, however, the load to be driven is a relatively heavy one, as with a fully loaded basket in the initial phase of a spin cycle, then slippage will occur between the clutch shoes 30 and the drum 32. In other words the drum 32 will not be immediately rotated at the speed of shaft 12 but rather will gradually pick up speed.

A clutching arrangement is provided between the inner drum 32 constituting the rotary input member of the clutching arrangement and the outer drum 14 comprising the rotary output member. The clutching arrangement includes the slip clutch described in U.S. Pat. No. 2,869,699, in which slip clutch shoes 36 are arranged about the exterior of the inner drum 32 and have arcuate surfaces urged into engagement with the exterior of the inner drum 32 by tension springs 38 secured at either end to the slip clutch shoes 36, drawing the same into engagement. The slip clutch shoes 36 have protrusions 40 which extend through slotted openings in the outer drum 14 to provide a positive driving connection between the slip clutch shoes 36 and the outer drum 14, such that whenever the slip clutch shoes 36 are in frictional engagement with the exterior of the inner drum 32, a driving connection is established between the inner drum 32 and the outer drum 14.

However, the centrifugal forces acting on the slip clutch shoes 36 tend to reduce the frictional engagement of the slip clutch shoes 36 and the outside diameter of the inner drum 32, so that the driving connection between the inner drum 32 and the outer drum 14 is limited to a certain predetermined rate of rotation of the inner drum 32, determined by the mass of the slip clutch shoes 36 and the spring force exerted by the tension springs 38. The rate of rotation of the inner drum 32 and the outer drum 14 will therefore not be at the same rate, i.e., there will be a reduced rate of rotation of the outer drum with respect to the inner drum.

According to the concept of the present invention, the high speed or direct driving connection established between the inner and outer drums differs from the clutching arrangement shown in the aforementioned U.S. Patent.

The arrangement according to the present invention consists basically of an interlocking of the inner drum 32 and the outer drum 14 by clutching elements carried by the inner and outer drums, rather than employing an intermediate clutching shoe carried by a separate carrier plate. The clutching elements are operable so as to come into engagement upon rotation of the input shaft 12 when the actuator is deenergized and to produce the high speed drive with the actuator energized by which the clutching interengagement of the clutching elements is precluded to establish the low speed drive.

The outer drum 14 is formed with portions located radially outward from the adjacent portions of the inner drum 32 to form a clearance space therebetween in which space is mounted the clutching elements.

These respective clutching elements include an elongate resilient element comprised of an arcuate strip spring 42 mounted to the exterior of the inner drum 32 and axially positioned below the centrifugal clutch shoes 36, formed so as to be preloaded into engagement with the exterior thereof as shown.

The mounting of the strip spring 42 is by means of a rivet 44 or other fastener connecting the midpoint of the strip spring 42 to inner drum 32 and leaving two free ends which extend transversely to the radius of the axis of rotation of the inner drum 32, which are adapted to be moved away from engagement with the exterior of the inner drum 32 under the influence of centrifugal force upon rotation of the inner drum 32 by the centrifugal clutching shoes 30.

The extent of outward movement of each of the free ends is limited by means of a rimmed platform 46 which is mounted to the inner drum 32 and extends radially outwardly from the exterior thereof. The rim 48 limits the outward extent of radial movement of the free ends of the strip spring 42.

Figure 3:
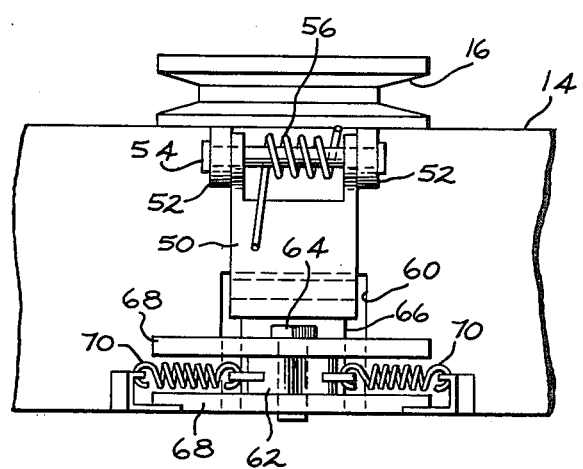
FIG. 3 is a side elevational view of the two-speed drive shown in FIG. 1 in fragmentary form depicting the mounting of the latch and trigger components.
Figure 6:
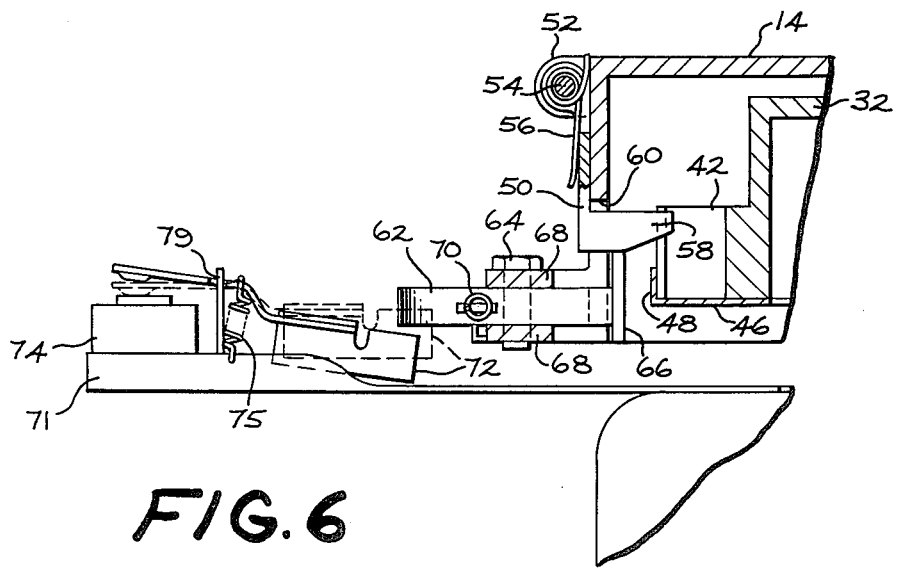
FIG. 6 is a partial view of the clutch drive unit shown in FIG. 1 showing the portion to which the latch is mounted and depciting the latch and trigger components in the high speed condition of the clutch.

The radially extended position of the ends of the strip spring 42 are positioned to be intercepted by the second clutch element mounted to the outer drum 14, which comprises a pivotally mounted latch 50 mounted on the clevis ears 52 with pivot pin 54. A lightweight torsion spring 56 lightly biases the latch 50 radially inwardly to be normally positioned as shown in FIGS. 3 and 6. The latch 50 has a radially inwardly extending projection 58 which in the radially inmost position of the latch 50 extends inwardly over the rim 48 as best seen in FIG. 6, such as to lie in the path of the ends of the strip spring 42 when the speed of rotation of the inner drum 32 is sufficient to cause them to be moved outwardly to the rim 48.

The projection 58 extends in through a cutout 60 formed in the lower end of the edge of the outer drum 14. A counterbalancing projection 61 is provided which is diametrically opposite from the latch 50 so as to provide a rotary balancing of the outer drum 14.

Figure 5:
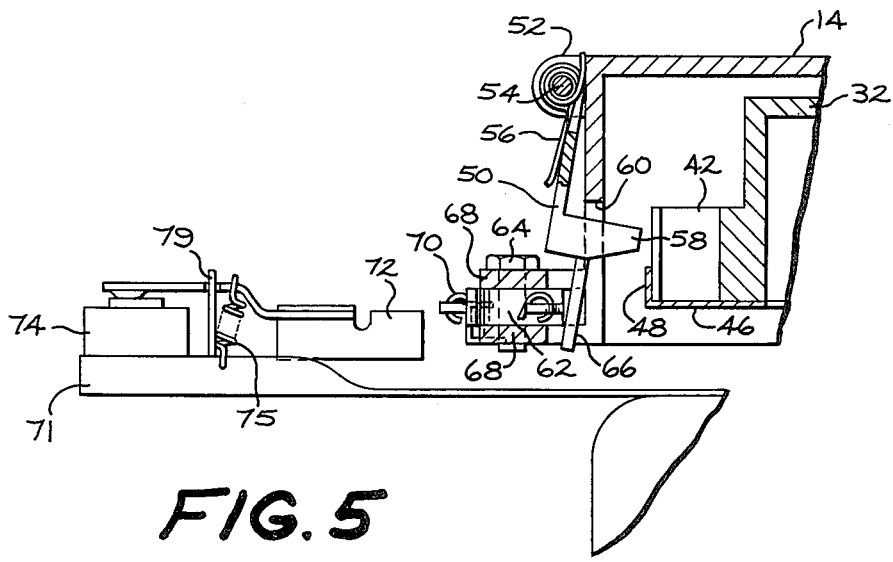
FIG. 5 is a fragmentary view of the two-speed drive as shown in FIG. 1 depicting the latch position in the low speed drive condition of the clutch unit.

The latch 50 is either free to move radially outward about its pivot pin 54 as depicted in FIG. 5 in response to rotation of the outer drum 14 or is precluded from such outward radial movement depending on the positon of the trigger element 62 mounted for pivoting movement about a centrally located pivot pin 64. Trigger 62 is positioned to be either engaged or not engaged with a lower downwardly projecting portion 66 of the latch 50.

The end of the actuator arm 72 adjacent the trigger 62 is urged downward by a spring 75.

The actuator arm 72 is positioned between upright tabs 73 of a pivot bracket 79 received in corresponding slots in the actuator arm 72, to be located and pivoted at midlength thereof.

The pivot pin 64 is supported on a pair of spaced projections 68 extending radially outwardly from the outside of the outer drum 14.

The trigger 62 is spring biased by centering springs 70 into the position whereby the forward end of the trigger 62 engages the rear outer face of the downward projecting portion 66 on the latch 50 so as to restrain the same against radially outward pivoting movement and maintain the projection 58 in position to intercept the outer ends of the strip spring 42 if these ends have been moved radially outward.

The position of the trigger 62 in turn is controlled by an actuator arm 72 which is operated by a solenoid 74 mounted on a bracket 71 secured to the motor housing 77. Thus, when the solenoid 74 is energized, the end of the actuator arm 72 adjacent the trigger 62 moves upwardly to contact the outer end of the trigger 62. This causes it to be pivoted against the bias of the centering spring 70 to the position shown in FIG. 5, in which the radially inward end of the trigger 62 moves out of contact with the downwardly projecting portion 66 and enabling the latch 50 to be pivoted outward.

The centrifugal force acting on the latch 50 acts on the trigger 62 to maintain it in its releasing position.

The centrifugal movements of the respective parts is staged; that is, the strip spring 42 is preloaded to urge it into contact with the inner drum 32 and to remain there until a predetermined low speed is achieved, i.e., 500 to 1000 rpm, but which speed is well above that at which the latch 50 is allowed to move outwardly against the relatively light spring force of the torsion spring 56. That is, the latch 50 is programmed to move outwardly almost immediately upon rotation of the outer drum 14, so that contact with the strip spring 42 ends will not occur if the actuator arm 72 and trigger 62 are in a position corresponding to low speed drive through the clutch unit 10.

This eliminates any possible "ticking" by unnecessary contact of the strip spring 42 and the projection 58 at the start of each drive cycle.

The outer drum 14 is caused to rotate during the beginning of high speed drive by virtue of the driving connection of the slip clutch shoes 36 in order to produce the initial rotation of the outer drum 14 necessary for actuation of the direct drive lockup.

It can be appreciated that the initial contact between the projection 58 of the latch 50 and the ends of the strip spring 42 in expanded position is cushioned by virtue of the deflection of the strip spring 42. Also, once driving relationship is established between the inner and outer drums by virtue of the inner engagement of the strip spring 42 and the latch 50, it is torsionally isolated due to the resiliency of the strip spring 42.

This eliminates the need for separate means to vibrationally isolate the inner drum 32 and outer drum 14.

At the end of each drive cycle, the latch 50 and the strip spring 42 will become disengaged since strip spring 42 will return to its inmost position and thus cause a frictional disengagement between the elements preparatory for initiation of another drive cycle.

In operation, rotation of the input shaft 12 causes rotation of the carrier arm 24 and, at the same time by the direct connection of the shaft extension 18, the pump coupling member 20 is driven, The centrifugal clutch shoes 30 pivot outward to establish frictional drive to the inner drum 32. The inner drum 32 in turn drives the outer drum 14 through the connection of the slip clutch shoes 36 therebetween to cause the outer drum 14 to thus rotate. If the low speed condition is called for by the position of the actuator arm 72 being in its up position, the trigger 62 has been rotated to its releasing position relative to the latch 50 and the latch 50 has moved radially outward about its pivot pin 54. The projection 58 is therefore no longer in position to contact the ends of the strip spring 42 after the ends have moved to their outermost position upon achievement of a predetermined rate of rotation of the inner drum 32 (FIG. 5).

The rim 48 precludes the ends from moving beyond the predetermined position shown in that FIGURE The outer drum 14 thus continues to be driven through the slip clutch shoes 36, after a predetermined rate of rotation of the outer drum 14 has been reached which rate is less than the rate of rotation of the input shaft 12. At this point, the centrifugal releasing forces acting on the slip clutch shoes 36 cause a release of the drive and, due to the slight deceleration of the outer drum 14, a reengagement of the slip clutch shoes 36 will occur such that the net effect is to drive the outer drum 14 at a lower rate of rotation than the inner drum 32 and thus also the input shaft 12.

After each washing machine cycle, the input shaft 12 comes to rest until the initiation of the next drive cycle.

If a high speed drive is called for by the machine controls, the solenoid 74 is operated to move the actuator arm 72 to the release position in which the trigger 62 is returned to the position shown in FIG. 6 by the centering spring 70 when no longer contacted by the actuator arm 72 upon initiation of the rotation of the input shaft 12, outer drum 14 and inner drum 32.

Thus, the latch 50 is precluded from pivoting radialy outwardly and, upon achievement of a rate of rotation of the inner drum 32 sufficient to cause the strip spring 42 to assume its outermost position, there is a contacting of the projection 58 and the ends of the strips spring 42 to establish a direct driving connection between the inner drum 32 and outer drum 14 to cause the outer drum 14 to be driven at the same rate of rotation as the inner drum 32.

It can be seen that the absence of the coupling element clamped between the shaft extension 18 and input shaft 12 leaves the central axial region of the unit free for a relatively extended length of the hub 33 available to support the inner drum 32 to provide adequate support therefor and thus increasing its life. In addition, this reduces the overall depth of the clutch unit 10 shortening the length of the shaft extension 18 and input shaft 12.

More significantly, the entire assemblage of the carrier plate, clutching shoes, bearings, etc., has been eliminated with only relatively simple, lightweight components required in their place, i.e., the first and second clutch elements consisting of the strip spring 42 and the latch 50.

The method of joining the shaft extension 18 by press fitting insures better concentricity of these elements reducing noise, and also simplifies their geometry, reducing machining, etc.

The resilient interconnection during high speed drive eliminates the need for separate isolators in order to eliminate "Holmholtz" noise.

These improvements have been made with the addition of relatively simple and reliable elements.

The embodiments of the invention in which an exclusive property or privilege is claimed are defined as follows:

1. A clutching arrangement for establishing rotary drive between a rotary input member and a rotary output member, said rotary output member having portions thereof disposed radially outward from adjacent portions of said rotary input member to form a clearance space therebetween, said clutching arrangement including:

an elongated resilient element secured to an adjacent portion of said input member within said clearance space between said input and output members and having at least one end extending transversely to the axis of rotation of said input member, said at least one end of said elongated resilient element being preloaded to be deflected radially outwardly by centrifugal forces acting thereon upon rotation of said input member at a predetermined rate of rotation and return to its original position upon a reduction in the rate of rotation of said input member below said predetermined rate; and latching means carried by said output member and having a portion located to move into engagement with said at least one end of said elongated resilient element after a predetermined extent of said radially outward movement of said at least one end;

whereby a rotary drive connection is established between said input member and said output member upon movement of said at least one end of said predetermined extent of radially outward movement.

2. The clutching arrangement according to claim 1 wherein said portion of said latching means is formed by a latching element pivotally mounted to said rotary output member for movement about an axis extending transversely to said axis of rotation of said input member and output member from a first position, in which said portion will intercept said at least one end of said elongated resilient element when said at least one end has moved radially outward said predetermined extent, to a second position in which said portion is disposed radially outward from its first position to clear said at least one end of said elongated resilient element when said at least one end has moved radially outward said predetermined extent; and wherein said clutching arrangment further includes actuation means selectively operable to position said latching element in either said first or second position about the pivotal mounting, whereby said transmission of rotary drive between said input member and said output member is controlled by the position of said latching element.

3. The clutching arrangement according to claim 2 further including means restraining said at least one end of said elongated resilient element from deflecting radially outwardly more than said predetermined extent of radially outward movement.

4. The clutching arrangement according to claim 3 wherein said rotary input member portions are comprised of a drum and wherein said elongate resilient element comprises an arcuately formed strip spring shaped to engage said drum exterior circumferential surface.

5. The clutching arrangement according to claim 4 wherein said means restraining said at least one end of said elongated resilient member from more than said predetermined extent of radially outward movement comprises a circular platform member secured concentrically to said input member drum portion and extending radially outward therefrom; said platform including a rim formed thereon disposed in said clearance space opposite said elongated resilient element and positioned to engage said at least one end of said elongated resilient element upon said predetermined extent of radially outward movement thereof, thereby limiting outward movement of said at least one end of said elongated resilient element.

6. The clutching arrangement according to claim 2 wherein said actuation means includes means restraining said latching element from pivotal outward movement by centrifugal force upon rotation of said rotary output member and further includes means for releasing said latching element to allow said pivotal outward movement of said latching element.

7. The clutching arrangement according to claim 6 further including centrifugal clutching means disposed between said input member and said output member and establishing a frictional drive of said output member upon rotation of said input member, whereby said rotation of said rotary input member produces rotation of said rotary output member prior to engagement of said at least one end of said elongated resilient element with said latching element.

8. The clutching arrangement according to claim 7 wherein rotation of said output member tends to cause pivotal outward movement of said latching element from its first to its second position and further including torsional spring means resisting said pivotal outward movement of said latching element in response to rotation of said output member.

9. The clutching arrangement according to claim 8 wherein said torsional spring means resisting said pivotal outward movement of said latching element in response to centrifugal force permits pivotal outward movement of said latching element about said pivotal mounting thereof prior to development of sufficient centrifugal force to cause said predetermined extent of radially outward movement of said at least one end of said elongated resilient element, whereby said pivotal outward movement of said latching element, if released by said actuation means, occurs prior to said predetermined extent of outward movement of said at last one end of said elongated resilient element.

10. The clutching arrangement according to claim 9 wherein said actuation means comprises a pivotally mounted trigger element having a tail portion extending radially outward from said rotary output member in a first position of said trigger element about its pivotal mounting; said trigger element further having a nose portion extending radially inward when said trigger element is in its first position for engagement with said latching element when said latching element is in its first inward position; so that, when said trigger element is in its first position, said latching element is restrained from said pivotal outward movement in response to rotation of said rotary output member; and wherein said trigger element has a second position rotated about its pivotal mounting whereat said nose portion is out of engagement with said latching element, so that said latching element is enabled to pivot radially outward; further including mean biasing said trigger element to its first position; and wherein said actuation means further includes a selectively operable actuator are mounted to be moved into a position in the path of said tail portion of said trigger element, when said trigger element is in its first position, and into a position out of the path of said tail portion, when said trigger element is in its first position, as said rotary output member rotates said trigger element past said actuator arm, said actuator arm being fixed with respect to said rotary input member.

11. The clutching arrangement according to claim 3 wherein said elongated resilient element comprises an arcuately shaped strip spring and wherein said strip spring is secured at an intermediate location thereon; whereby either free end of said arcuate strip spring is enabled to move radially outwardly, whereby said latching means is engageable with said element at either end of said strip spring, whereby torque may be transmitted from said rotary input member to said rotary output member upon rotation of said input member in either direction.

12. A two-speed clutching arrangement producing a driving connection between a rotary input shaft and a rotary output member in either of two selected drive modes, including a first mode in which said rotary output member is driven at the same rotative speed as said rotary input shaft and a second mode in which said rotary output member is driven at a reduced rotative speed relative to said rotary input shaft, said clutching arrangement comprising:

an inner drum rotatably supported concentrically to said rotary input shaft;

centrifugal clutching means producing a driving connection between said rotary input shaft and the interior of said inner drum upon rotation of said rotary input shaft, an outer drum concentrically mounted over said inner drum and concentric to said rotary input shaft, said outer drim comprising said rotary output member;

slip clutch means interconnecting the exterior of said inner drum and the interior of said outer drum; said slip clutch means comprising means producing a driving interconnection between said inner drum and said outer drum up to a predetermined rate of rotation of said outer drum less than the rate of rotation of said inner drum, thereafter producing slip therebetween, whereby said outer drum is driven at a reduced rotative speed relative to the rate of rotation of said inner drum; and direct drive clutch means including a strip spring carried by said inner drum and having at least one free end adapted to move radially outward upon rotation of said inner drum and also including latching means carried by said outer drum and selectively operable to produce a driving engagement with said at least one free end of said strip spring when said at least one free end has moved radially outward an extent corresponding to a rate of rotation of said inner drum less than the predetermined rate of rotation of said outer drum, whereby upon selective operation of said direct drive clutch means by said latching means, said outer drum is driven at the same rotative speed as said inner drum, whereby said two speed drive is provided by said reduced rate of rotation of said outer drum and said direct drive rotation of said outer drum by said inner drum.

* * * * *